Nov. 12, 1940.  H. F. ALBRECHT  2,221,017
SAFETY DEVICE FOR TENSION SHUTTERS
Filed June 15, 1938
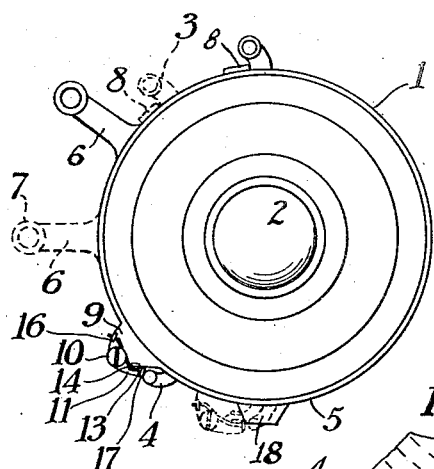
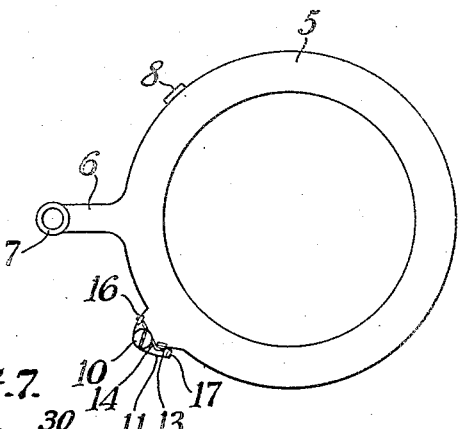
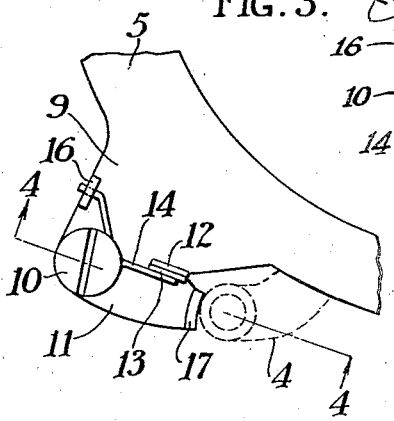
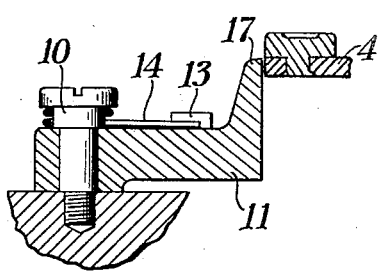
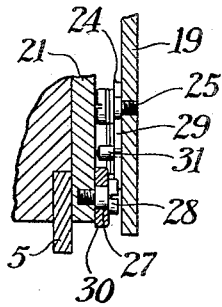
HERMANN F. ALBRECHT
INVENTOR
BY
ATTORNEYS Patented Nov. 12, 1940

2,221,017

UNITED STATES PATENT OFFICE 2,221,017

SAFETY DEVICE FOR TENSION SHUTTERS

Hermann F. Albrecht, Schoeneiche, Kreis Niederbarnim, Germany, assignor to Eastman Kodak Company, Rochester, N. Y., a corporation of New Jersey Application June 15, 1938, Serial No. 213,863
In Germany July 19, 1937

7 Claims. (Cl. 95—53)

This invention relates to safety devices for tension shutters.

One object of my invention is to provide a shutter of the type in which the shutter spring must be tensioned manually before an exposure can be made with a means for operating the tensioning lever, which means can also be used for operating the trigger. Another object of my invention is to provide a shutter of the type described, in which the operating means is so positioned that when the trigger has been operated, a pressure on the operating means in the normal direction to operate the trigger will be ineffective unless the member is first moved in a reverse direction to set the shutter tensioning member. Another object of my invention is to provide a shutter operating means which will greatly lessen difficulties due to improperly positioning the shutter and camera parts for an exposure. A still further object of my invention is to provide a shutter with a pivoted trigger engaging member and with a movable cam so arranged that the trigger engaging member is cammed off of and moves beyond the limit of travel of a trigger in making an exposure so that it is necessary to return the pivoted member to an operative position before a second exposure can be made, this return movement being adapted to set the shutter, and other objects will appear from the following specification, the novel features being particularly pointed out in the claims at the end thereof.

In cameras with the so-called tension shutters, in which the shutter has to be tensioned before it is released, the usual tensioning arrangements between the film forwarding and the release are insufficient to avoid accidental exposures. If the shutter operation depends only on the film forwarding, then the release can be operated after the film has been forwarded so that the release is then locked against a repeated movement. In means of this kind, the camera user first of all has to move the film forward to the extent of one picture so that the release can be operated again, after which an exposure can be made if the tensioning of the shutter has not been overlooked.

So as to avoid errors of this nature, it has already been suggested that the shutter tensioning should be coupled to the film forwarding, and also to provide an effective locking means between the film forwarding and the shutter release. This arrangement, however, cannot be carried out for folding cameras without extensive use of couplings and such like mechanical members. For this reason, an arrangement was used in which the usual alternately acting locking means was provided between the film forwarding and release and an additional locking means was arranged between the shutter tensioning lever and the shutter release. This arrangement assures a very considerable degree of safety.

According to the invention, another method, which has additional advantages, is adopted for producing dependence between the tensioning lever and release.

In said tensioning shutters it is also known that a rotating member can be arranged on the shutter which is provided with an external manipulating means furnished with two projections which alternately carry the setting and release levers with them. This method does not introduce any alternative locking between the tension lever and release lever in the known arrangements. The locking means in an arrangement of this kind can, however, be simply made so that the carrying projection which cooperates with the release is made as a single acting carrier catch which can only engage with the release lever in the release direction, and only arrives at the engaging position if the rotating member is turned until tensioning position of the tensioning lever is arrived at. In this way a coupling is effected between the operating member provided with a handle, and the release only if the shutter has been previously tensioned in the ordinary way with the same lever or operating handle. In all other positions the operating handle can be inoperatively moved to and fro with regard to the release without actuating the same.

A preferred embodiment of my invention is illustrated in the accompanying drawing wherein like reference characters denote like parts throughout:

Fig. 1 is a front plan view of a shutter and actuating member constructed in accordance with and embodying a preferred form of my invention.

Fig. 2 is a plan view of the operating member removed from the shutter in Fig. 1.

Fig. 3 is an enlarged fragmentary detail showing that portion of the operating member which is adapted to engage and operate the shutter trigger.

Fig. 4 is an enlarged fragmentary sectional detail taken on line 4—4 of Fig. 3.

Fig. 5 is a front plan view on a somewhat enlarged scale, of a shutter similar to the shutter in Fig. 1, but with the parts in a different position, and a portion of the shutter broken away to show structure inside of the shutter.

Fig. 6 is an enlarged detail section taken on line 6—6 of Fig. 5.

Fig. 7 is a fragmentary view of a portion of the shutter illustrated in Fig. 5, showing the relation of the parts when the shutter trigger is disengaged.

The shutter housing 1 may contain the usual objective 2 and may be fitted with the usual shutter tensioning lever 3 and the release lever or trigger 4. A rotating ring 5 may be mounted coaxially with the objective and may be provided with an operating handle 7 carried by an extension 6. This ring has a shoulder 8 which, when moved by the ring, moves the setting lever 3 from the position shown in full lines to the position shown in broken lines in Fig. 1. This movement sets the shutter.

The ring 5 also carries a boss 9 on which a latch 11 is mounted on the pivot 10, see Figs. 3 and 4. The boss 9 carries a bent-over portion 12 which serves as a stop for a corresponding bent-over portion 13 carried by the latch 11. This stop position is maintained by the hair-pin spring 14, one end of which rests against the projection 13 and the other end rests between the lugs 16 of a projection from the boss 9. The height at which the pivot 10 stands off the edge of the ring 5 is such that the release lever 4 can pass over this pivot 10, and the portions 12 and 13 project upwardly only so far from the boss 9 of the ring and the face of the catch 11, as to allow the release lever 4 to pass over them. The free end of the catch is bent over upwardly so that it forms a stop 17 for the knob of the release 4.

If the ring is moved in a clockwise direction from the inoperative position by means of the handle 7 until the lever 3 arrives at the tensioning position, then, the catch 11 snaps resiliently over the release lever 4 and comes to rest with the end 17 behind the knob of the release lever 4 at the moment when the ring 5 has arrived at its end position in which the tensioning lever 3 has been placed under tension. If the ring 5 is now moved in a counter-clockwise direction by means of the handle 7, then the release lever 4 is carried forward by the catch 11 and the shutter is released. During this movement, the shoulder 8 has moved away from the tensioning lever 3 so that this lever will freely return to its inoperative position after an exposure has been made.

The shutter housing 1 has mounted thereon a radial cam or projection 18 which extends outwardly from the housing, as viewed in Fig. 1. This cam is positioned to lie in the path of the shoulder or lug 13 of the catch 11 so as to engage the lug when the ring 5 is moved in a counter-clockwise direction by the handle 7 to operate the shutter trigger 4. When the trigger lever 4 approaches the end of its movement, the shoulder 13 engages the cam 18 and pivots the catch 11 about its pivot 10 and out of engagement with the lever or trigger 4, as shown in Fig. 7. As the trigger is now free, it will return to its original or rest position, as shown in full lines in Fig. 1, under the action of a spring on the master member, not shown. After the exposure has been completed and the trigger 4 has been returned, the ring 5 is rotated in a clockwise direction to bring the shoulder 8 on the ring into engagement with and to move the lever 3 to the full line position, Fig. 1, to tension the shutter. The end 17 of the catch 11 is spaced from the shoulder 8 a distance which is substantially equal to the angular distance between the lever 3 in tensioned position and the trigger 4 in rest position so that when the lever 3 has been tensioned, the end of the catch 11 will be moved to a position to snap into operative position behind the trigger 4, as clearly shown in full line in Fig. 1.

In order to permit time exposures to be made, the speed setting ring 19 of the shutter—Fig. 5— can be coupled to the projection 18 in such a way that it can be moved out of the reach of the catch for setting the shutter for "bulb" or "time" so that the catch 11 will not be lifted by the projection 18 in the end position of the release, thus enabling the handle 7 to be again operated when a "time" exposure is to be made or enabling the handle to be pressed down, held down and then released when a "bulb" exposure is to be made.

The structure by which this end is accomplished is as follows: The shutter setting dial 19 indicates the type of exposure by means of a pointer 20. A fixed pin 23 is mounted on the underside of the ring 19. Mounted on the same side of the ring 19 is a pawl 24 which is pivoted on a stud 25. The stationary shutter housing has mounted thereon a plate 21 which carries the slide member 30 with its control cam or projection 18, the member 30 being formed with slots 27 passing about pins 28 carried by the housing plate 21. The cam 18 is normally held by friction in the position shown in the sketch.

The pawl 24 is in a different plane from that of the slide 30, but in the same plane as the head of the pin 28. The pawl also carries an inwardly directed pin 31 which extends into the plane of the slide 30. The pawl 24 is normally turned in a counter-clockwise direction by a spring 33 towards a fixed stop pin 32.

When the speed ring 19 is moved to indicate a "bulb" exposure by the arrow 20, the pin 23 moves in a counter-clockwise direction toward the slide 30. During the first part of this movement, however, the pawl 24 is moved away from the pin 28, and, due to the action of the spring 33 and the inclined edge 29, pivots about its stud 25 until it bears against the stop pin 32. The pin 23 then strikes the edge 34 of the slide 30 and moves this counter-clockwise away from the locking pawl 11 so that when the shutter is released by actuating the ring 5 in the manner above described, this pawl 11 will be permanently in engagement with the release lever 4.

If the speed setting ring is now returned from the "bulb" setting to one of the automatic exposure settings, i. e. by rotating the ring 19 clockwise, the pin 23 on said ring is first moved in a clockwise direction away from the slide 30. Immediately afterwards, the pin 31 on the pawl 24 strikes the edge 40 of the slide 30 and moves the latter clockwise until the pins 28 are in the right-hand ends of the slots 27, as shown in Fig. 5. This position is reached shortly before the one second setting reaches the pointer 20, as indicated in Fig. 5. During the initial movement of the ring 19, the inclined edge 29 of the pawl 24 slides on the pin 28 so that the pin 31 on the pawl is brought out of range of the edge 40 of the slide 30 and moves along the edge 41 without carrying the slide 30 with it.

As will be seen from the above described construction, my present shutter greatly reduces the liability of improper operation since the latch 11 only lies in an operative position with respect to trigger 4 when the shutter is in a set position and as soon as an automatic exposure is made, the latch 11 is no longer in an operative position, having ridden on the cam 18 past the trigger, as shown in Fig. 7, for permitting it to return to its initial position. Thus, any further downward pressure on the handle 7 does not affect the trigger in any way, and since the ring 5 has already turned to its limit of movement, the handle 7 cannot move at all. The operator may then move handle 7 in a counter-clockwise direction to accomplish two purposes—first, the shoulder 8, through its engagement with the setting lever 3, will move this lever to set the shutter and just as the setting lever reaches its set position, in the embodiment shown in Fig. 5, the latch 11 snaps over the end of the trigger 4 so that the parts will now be in position to operate the shutter. In the embodiment shown in Fig. 1, on the other hand, the latch 11 is moved beyond the trigger 4 when the trigger 3 is set, as shown in dotted line in Fig. 1. Then by moving the ring 5 in a counter-clockwise direction the latch 11 is brought into engagement with the trigger 4 as shown in full line in Fig. 1. No further setting movement, of course, can be accomplished when the parts are in this position. The handle 7 can then only be moved in a counter-clockwise direction to actuate the shutter.

Should a "bulb" or "time" exposure be required, the setting of the ring 19 automatically moves the cam projection 18 into such a position that it will not release the latch member 11 during the first downward movement of the handle 7, and it is therefore possible to hold the handle 7 down a sufficient time for the "bulb" exposure, or to actuate the handle 7 a second time to accomplish a "time" exposure.

It will be noted that in the preferred embodiment of my invention illustrated in the drawing the structure is an extremely simple one which can be readily added to shutters of a known type now on the market.

What I claim is:

1. A safety device for photographic shutters including in combination, a shutter casing, a setting lever projecting from the casing and movable to a set position for setting the shutter, a trigger movable from a rest position for releasing the shutter after the latter has been set, and a single oscillatable member including a pair of spaced lugs for engaging said setting lever and the trigger, said lugs being spaced on said member a distance not substantially less than the angular distance between the lever in its set position and the trigger in its rest position, cooperating means between the trigger and the trigger lug forming a slip-off connection operative to move the trigger by the lug and to continue movement of the lug after slipping off the trigger, whereby the trigger may return to its normal position of rest independently of the oscillatable member.

2. A safety device for photographic shutters including in combination, a shutter casing, a setting lever projecting from the casing and movable to a set position for setting the shutter, a trigger movable from a rest position for releasing the shutter after the latter has been set, and a single oscillatable member including a pair of spaced lugs for engaging the setting lever and the trigger, said lugs being spaced on said member a distance not substantially less than the angular distance between the lever in its set position and the trigger in its rest position, cooperating means between the trigger and the trigger lug forming a slip-off connection operative to move the trigger by the lug and to continue movement of the lug after slipping off the trigger, whereby the trigger may return to its normal position of rest independently of the oscillatable member, said slip-off connection being operative upon moving the oscillatable member in a reverse direction to move the trigger lug past the trigger in setting the shutter through the setting lever lug.

3. In a photographic shutter, the combination with a shutter casing, a shutter setting lever projecting from the casing and movable to a position to set said shutter, a trigger for releasing the set shutter, an oscillatable manually controlled member mounted on said casing and carrying lugs adapted to engage the setting lever and trigger, a pivotal mount for the trigger lug carried by said member, an adjustable speed setting ring carried by said casing, and a cam movably mounted on said casing and operatively connected to said ring so that adjustment of the latter serves to automatically move said cam into and out of the path of the pivoted lug for operating the trigger, said cam when moved into said path being adapted to disengage said pivoted lug from said trigger at the completion of an exposure.

4. In a photographic shutter, the combination with a shutter casing, a shutter setting lever projecting from said casing and movable to a position to set said shutter, a trigger movable from a rest position for releasing the set shutter, an oscillatable manually controlled member mounted on said casing and carrying lugs adapted to engage the setting lever and trigger, said lugs being spaced on said member a distance substantially equal to the angular distance between the lever in its set position and the trigger in its rest position, a pivotal mount for the shutter lug carried by said member, a cam movably mounted on the casing and movable into and out of the path of the pivotal lug for operating the trigger, said cam being adapted to be moved to a position to cam the pivoted lug to disengage the latter from the trigger after an exposure is completed to permit said trigger to automatically return to said rest position, the manually operable member being movable to set the setting lever with the first-mentioned lug and at the same time to move the pivoted lug into operative contact with the returned shutter, and means for moving said cam.

5. A safety device for photographic shutters including in combination, a shutter casing, a setting lever projecting from the casing for setting the shutter, a trigger for releasing the shutter after latter has been set, a single oscillatable member including a pair of spaced lugs for engaging the setting lever and the trigger, a pivotal mount on said oscillatable member for the trigger operating lug, a setting dial for setting the mechanism in the shutter for different types of exposures, including "time," "bulb" and "instantaneous," a cam movably carried by the shutter for engaging the pivoted lug to cam it from the trigger, and cooperating parts on said dial and said cam arranged to move the latter out of the path of said pivoted lug so as not to be engaged thereby when said dial is set for a "time" exposure.

6. A safety device for photographic shutters including in combination, a shutter casing, a setting lever projecting from the casing for setting the shutter, a trigger for releasing the shutter after latter has been set, and a single oscillatable member including a pair of spaced lugs for engaging the setting lever and the trigger, a pivotal mount on said oscillatable member for the trigger operating lug, a setting dial for setting the mechanism in the shutter for different types of exposures, including "time," "bulb" and "instantaneous," a cam movably carried by the shutter for engaging the pivoted lug to cam it from the trigger, said dial and cam including cooperating parts comprising a pin and a pivoted latch by which said cam may be moved into the path of said pivoted lug when said dial is set for one type of exposure or may be automatically moved out of said path when said dial is set for another type of exposure.

7. A safety device for photographic shutters including in combination, a shutter casing, a setting lever projecting from the casing for setting the shutter, a trigger for releasing the shutter after latter has been set, and a single oscillatable member including a pair of spaced lugs for engaging the setting lever and the trigger, a pivotal mount on said oscillatable member for the trigger operating lug, a setting dial for setting the mechanism in the shutter for different types of exposures, including "time," "bulb," and "instantaneous," a cam movably carried by the shutter for engaging the pivoted lug to cam it from the trigger, said dial and cam including cooperating parts comprising a pin and a pivoted latch carried by the dial and adapted to engage the movably mounted cam and move the latter out of the path of said pivoted lug when said dial is set for a "bulb" or "time" exposure or to move said cam into said path when said dial is set for "instantaneous" exposure.

HERMANN F. ALBRECHT.